July 4, 1950
K. B. CONNER
2,513,453
SAFETY BRAKE LOADING DEVICE FOR RUBBER
AND PLASTIC MILLS AND THE LIKE
Filed Sept. 13, 1948
4 Sheets-Sheet 1

Inventor:
Kenneth B. Conner
by his Attorneys
Howson & Howson

July 4, 1950 K. B. CONNER 2,513,453
SAFETY BRAKE LOADING DEVICE FOR RUBBER
AND PLASTIC MILLS AND THE LIKE
Filed Sept. 13, 1948 4 Sheets-Sheet 2

Inventor:
Kenneth B Conner
by his Attorneys
Howson &
Howson

July 4, 1950  K. B. CONNER  2,513,453
SAFETY BRAKE LOADING DEVICE FOR RUBBER
AND PLASTIC MILLS AND THE LIKE
Filed Sept. 13, 1948  4 Sheets-Sheet 3
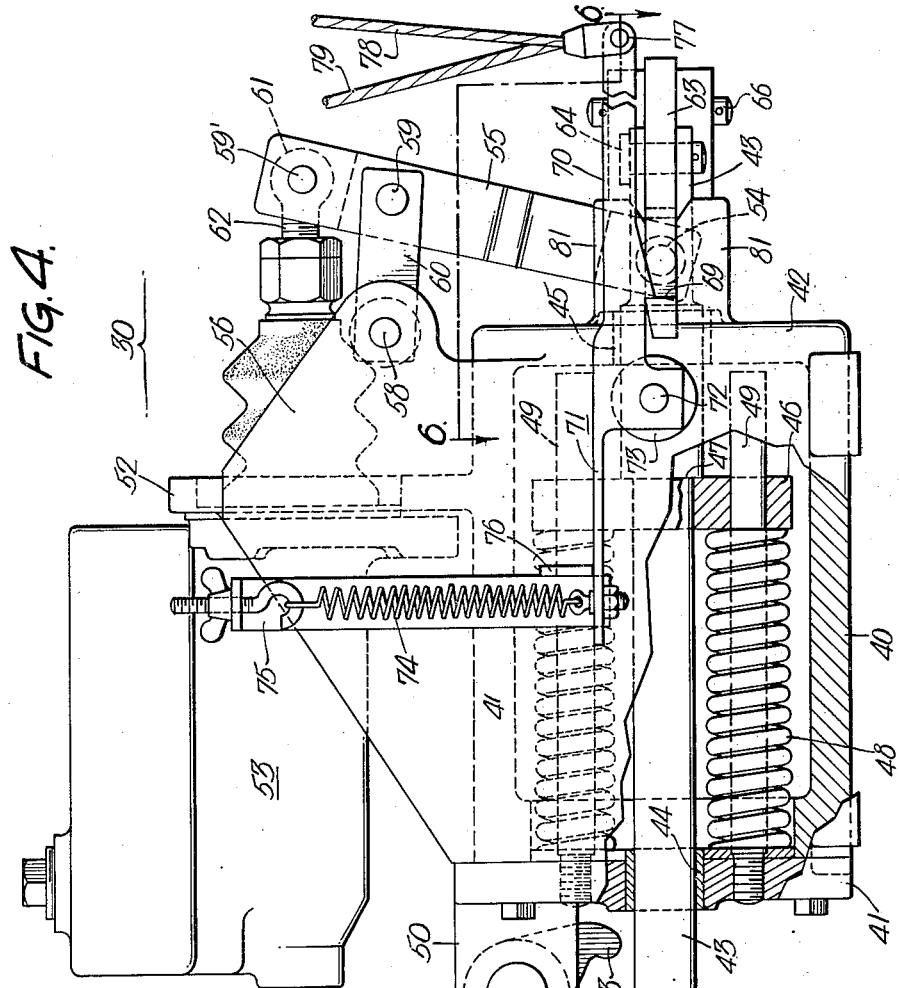
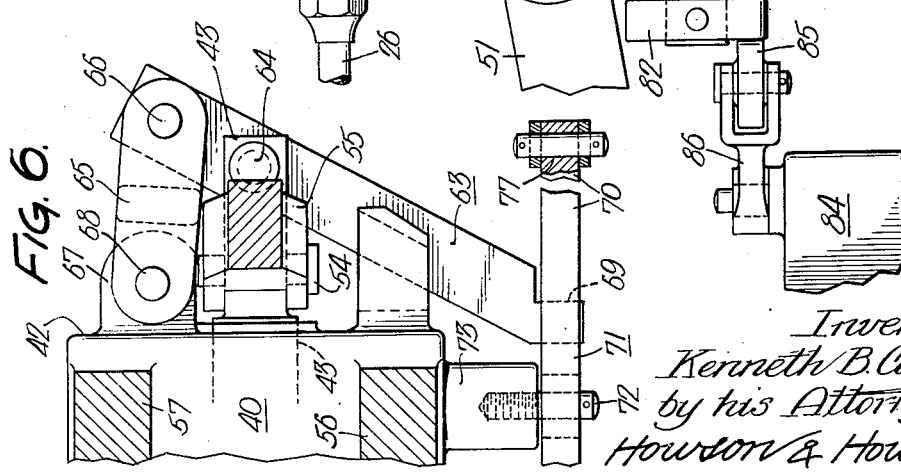
Inventor:
Kenneth B. Conner
by his Attorneys
Howson & Howson

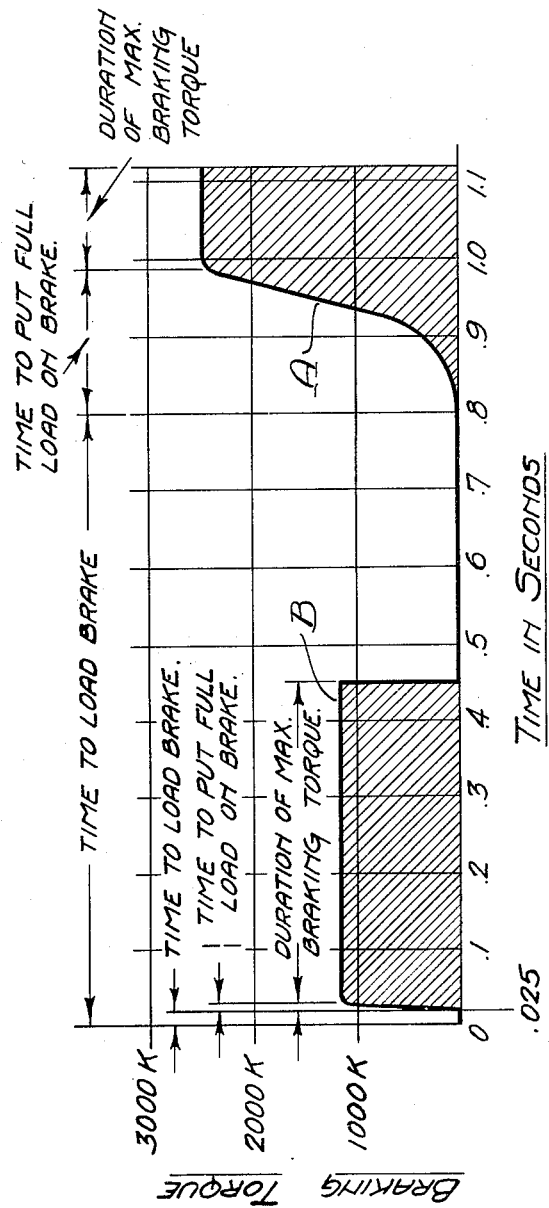

Patented July 4, 1950

2,513,453

UNITED STATES PATENT OFFICE 2,513,453

SAFETY BRAKE LOADING DEVICE FOR RUBBER AND PLASTIC MILLS AND THE LIKE

Kenneth B. Conner, Riverton, N. J., assignor to William R. Thropp & Sons Co., Trenton, N. J., a corporation of New Jersey Application September 13, 1948, Serial No. 49,026

2 Claims. (Cl. 74—2)

1

This invention relates to an improved brake and brake loading mechanism designed to be used on heavy machinery having large inrunning rolls, for example rubber and plastic mills, and calenders.

In the operation of inrunning rolls and similar rolling machinery where it is necessary that the worker be positioned in close proximity to the inrunning rolls, there is always the danger that the worker may fall onto the rolls in such a way that serious physical injury results. Safety devices for inrunning rolls have been used for many years but with varying degrees of success. Such devices include:

1. Externally contracting band brakes operated by a weighted lever arm, retained by a latch, which in turn may be either mechanically released or released by deenergization of a solenoid.

2. A spring-set solenoid-operated shoe or disc brake.

3. Electric braking systems comprising a multiplicity of solenoid-operated contactors.

Examples of the first two classes above, are shown in the following patents issued to J. W. Thropp: No. 1,447,105, No. 1,490,788, No. 1,621,442.

A particular disadvantage of the mechanical or falling weight type of brake loading device resides in the fact that the rolls cannot always be stopped in time to avoid serious injury. Furthermore, the severity of injury increases in direct proportion to the time required to obtain maximum braking effort. Due to the relatively great length of time required to apply braking effort, it is necessary to utilize the maximum braking torque obtainable to stop the rolls in the time permitted by various safety codes, and as a result extreme stresses are set up in the various structural members of the mill. It has been found in years of practice that the mill operator, being aware of the fact that the safety device may not stop the rolls in sufficient time to avoid injury, will attempt to pull his hand or arm out of the rolls before tripping the brake in the event of an accident. Consequently, many severe injuries have resulted which could have been avoided solely or in part if the operator knew positively that the rolls could be stopped in time to avoid serious injury.

The disadvantage of the third class of braking systems mentioned above, resides in the fact that maximum braking torques are limited by the inherent electrical characteristics of the motor to a value less than that obtainable by a device constructed in accordance with the present invention. In other words, if the motor is properly

2 designed for driving the mill under normal conditions of operation, it is only half the size required to stop the rolls in the required time. Therefore, if the proper motor is installed on the mill, no adequate safety feature is present and on the other hand, if a sufficiently large motor is used to provide adequate safety, the efficiency of the mill and the cost are practically prohibitive.

I have found that my improved brake, as described herein, will stop inrunning rolls consistently in 40% of the distance of peripheral roll travel as compared to the falling weight type of device disclosed in the above Thropp patents. In addition, the present device utilizes only approximately 40% of the maximum torque required by the falling weight type of brake. Another serious objection to the falling weight device referred to in the above cited patents, resides in the fact that constant vibration of the mill tends to wear the latch action even when the brake itself is not used, so that such a brake in time fails to function properly.

A disadvantage of any braking device dependent on the operation of one or more solenoids resides in the fact that residual magnetism may prevent free movement of the solenoid armature, thereby causing an excessive time delay in the application of the braking load. The time normally required to actuate a single solenoid is not less than .05 second even when the mechanism is functioning properly.

Since electric braking systems of the dynamic, regenerative, or plugging types utilize a plurality of successively actuated solenoids, the time required to apply the braking load with such a system insofar as the solenoids are concerned will be roughly the number of solenoids multiplied by .05 second, even when the system is functioning properly. In addition to the time required to actuate a plurality of solenoids, an electric motor has inherent limitations of design due to commutation, conductor size, etc. which clearly prevent comparable results with an internal expanding hydraulic brake mechanically actuated.

Therefore, whether there be only one solenoid or a plurality of solenoids in the conventional system, there is a "solenoid" time delay equivalent to the number of solenoids multiplied by .05 second. Since the total loading time of the present invention is .025 second, it will be apparent that in any system where one or more solenoids are used, the time required just to operate a single solenoid will be at least twice the total time required to load the brake when the present invention is utilized.

Modern industrial safety requirements as well as safety legislation have posed a practical problem which is not easy of solution in view of the fact that the speed and size of mill rolls, as well as the number of rolls, have been greatly increased in recent years. Obviously, the problems involved in stopping small rolls at slow speed within a required peripheral distance are increased by a geometrical progression rather than an arithmetical progression as the size and speed increases. This trend to constantly higher speeds and larger, heavier machines in order to obtain greater production per unit has rendered all existing brake systems obsolete. Regardless of safety regulations, it is essential for the general safety of the operator that even large machines be equipped with safety devices providing the maximum freedom from injury.

In addition to the increased speeds and sizes referred to above, the problem is also complicated by the fact that the braking surface must not be subjected to contamination from the various chemicals, dusts and abrasives used in the rolls. Externally contracting shoe-type brakes and disc-type brakes (which provide neither fan action nor proper sealing) are not capable of consistently dependable operation under such operating conditions. My construction permits the use of an internal expanding automotive type brake which may be properly sealed against the entrance of foreign material, thereby avoiding glazing of the braking surface. This result follows because not only is the surface enclosed but the fan action of the rotating brake drum tends to prevent foreign material from collecting in and around the brake assembly.

A primary object therefore, of my invention is to provide a braking mechanism for inrunning rolls which will completely stop the rolls with a minimum of peripheral roll travel.

A further object is to provide a device of the character described which will completely stop heavy inrunning rolls in a minimum of time and with a minimum of peak braking torque.

A further object of the invention is to provide a reliable braking system for rubber or plastic mills which will not be adversely affected over long periods of disuse of the brake.

A further object of the invention is to provide a hydraulically actuated internal expanding brake and a spring-loaded plunger adapted to actuate a hydraulic cylinder connected to the brake.

Further objects will be apparent from the specification and drawings in which:

Fig. 3 is a detail plan of the driving connections of the device, showing a typical location of the brake element;

Fig. 4 is a side elevation on an enlarged scale of the brake loading unit;

Fig. 6 is a fragmentary sectional detail as seen at 6—6 of Fig. 4; and

Fig. 7 shows the loading curve of my improved braking system as compared with the loading curve of the previously used falling weight type of brake loading device.

The invention comprises essentially the provision of an internal expanding brake connected to the drive shaft of the mill. The brake loading mechanism comprises a heavily loaded, light-weight plunger adapted to actuate a hydraulic master cylinder when the plunger is released by means of a trigger.

Figure 1:
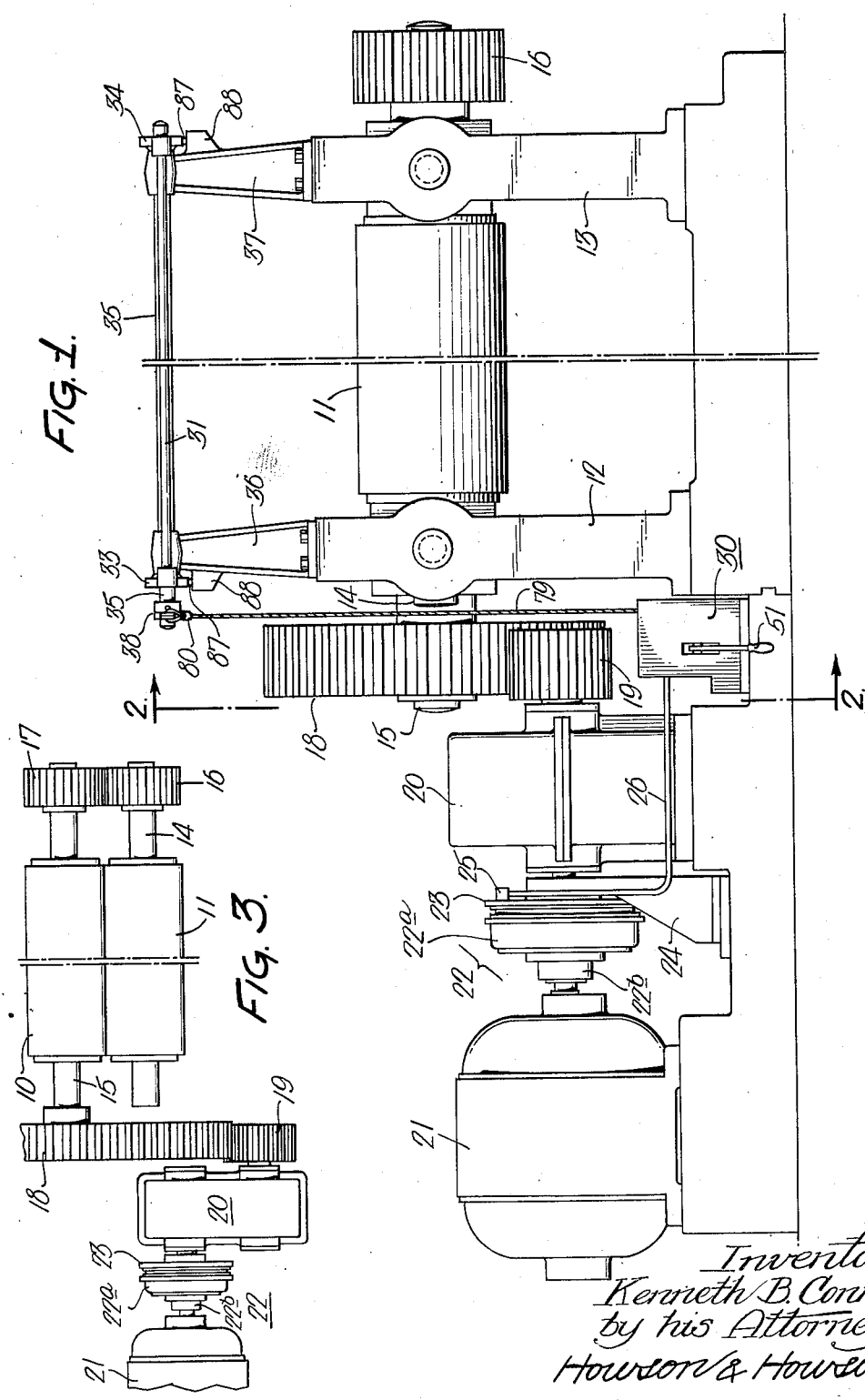
Fig. 1 is a side elevation of a rubber or plastic mill incorporating my invention.
Figure 2:
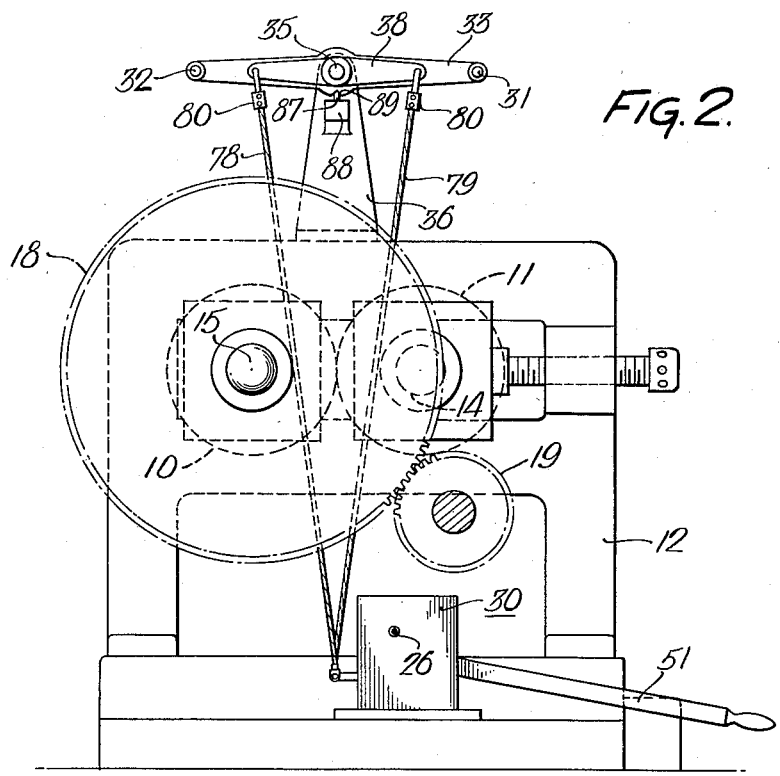
Fig. 2 is a side elevation of the structure of Fig. 1 as seen at 2—2 of Fig. 1.

Referring now more particularly to the drawings, Figs. 1–3 show a conventional rubber or plastic mill having a pair of inrunning rolls 10 and 11 journaled in housings 12 and 13. The roll shafts 14 and 15 carry at one end a pair of spur gears 16 and 17 which mesh with each other. Roll shaft 15 is extended at the opposite end of roll 10 and carries a large bull gear 18 driven by pinion gear 19 mounted on gear box 20. An electric motor 21 is connected to gear box 20 through the brake assembly 22 which is of the conventional internal expanding automotive type commonly supplied for trucks and buses. The brake drum 22a is mounted on a coupling 22b and the backing plate 23 is mounted on a pedestal 24 and is provided with a hydraulic connection 25 to which is attached an oil line 26. It will be understood that the brake assembly may be mounted in any convenient location on the mill and should be adapted to cooperate with any high speed shaft in the drive.

The brake loading mechanism designated generally 30 is mounted on the bed plate in such a position that it is conveniently accessible to the safety bars 31 and 32 attached to side arms 33 and 34 which are in turn attached to a central rock shaft 35. Shaft 35 is pivotally mounted in brackets 36 and 37. A cross arm 38 is rigidly attached to one extremity of rock shaft 35 as shown in Figs 1 and 2.

Figure 5:
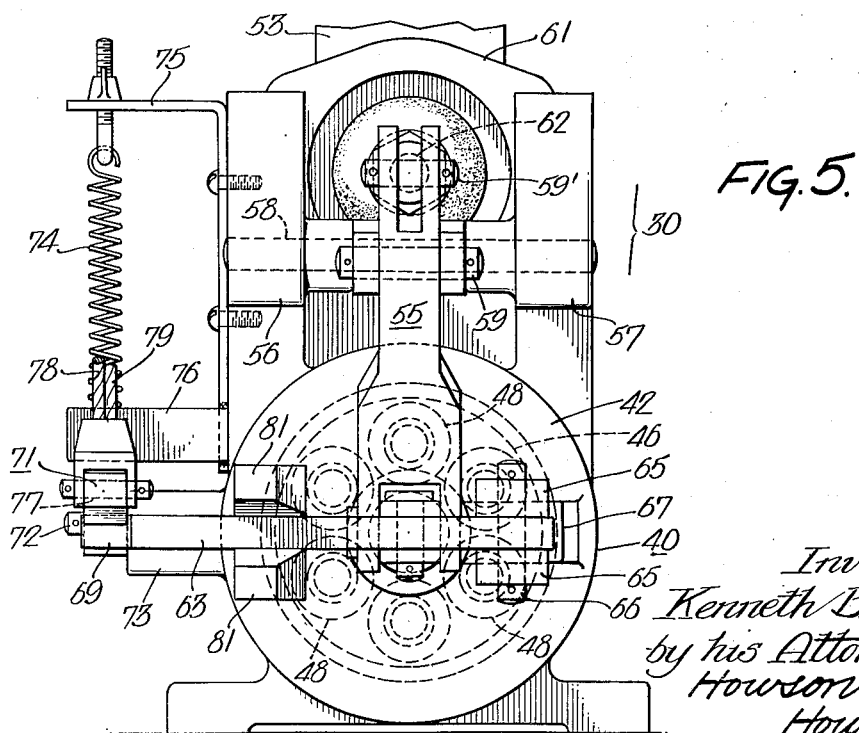
Fig. 5 is a front elevation of the structure of Fig. 4.

The loading device 30 comprises a casing 40 (Fig. 4) which is of cylindrical configuration and is provided with end plates 41 and 42, the latter of which may be an integral part of the casing 40. A plunger 43 is journaled for axial movement in end plate 41 by means of bushing 44, and in end plate 42 by means of bushing 45. A piston 46 is mounted on plunger 43 and is adapted to abut shoulder 47 on the plunger. Six helical compression springs 48 are adapted to be compressed between piston 46 and end plate 41. The number of springs and their size will, of course, depend upon the requirements of the particular installation. Springs 48 are maintained in position by means of aligning rods 49, 49 threaded into end plate 41 and extending through piston 46. End plate 41 carries an ear 50 which pivots the resetting lever 51. The cylindrical 40 is provided on its upper portion with a flange 52 on which is mounted a hydraulic master cylinder 53. Plunger 43 extends axially through end plate 42 and is provided with a pair of holes drilled at right angles to each other in the plunger extremity. The innermost hole accommodates a pin 54 which secures a bifurcated extremity of link 55. Link 55 is pivoted to webs 56 and 57 (Fig. 5) by means of pins 58, 59 and link 60. The upper extremity of lever 55 is pinned to the eye 61 of master cylinder plunger 62 by means of pin 59'.

A sear lever 63 is pivoted to plunger 43 by pin 64 and to link 65 by means of pin 66. Link 65 is in turn pivoted to ear 67 on end plate 42 by means of pin 68. The opposite end of sear lever 63 is provided with a beveled sear 69 adapted to be engaged by trigger 70 when the plunger 43 is retracted by means of lever 51. Trigger lever 71 which carries trigger 70, is pivoted to cylinder 40 by means of screw 72 and boss 73. Trigger lever 71 is also spring-loaded by means of helical spring 74 suspended from bracket 75. Arm 76 limits upward pivoting movement of trigger lever 71 to prevent the sear 69 from overriding trigger 70. The opposite end of trigger lever 71 extends beyond trigger 70 and is provided with a hole 77 to which cables 78 and 79 are connected, as shown in Fig. 2. The cables 78 and 79 are secured at the extremities of cross arm 33 by means of clevises 80, 80. End plate 42 is provided with a pair of internally biased guides 81, 81 which facilitate setting of sear lever 63.

The opposite end of plunger 43 is provided with an adjustable collar 82 which is engaged by bell crank 83 on setting lever 51. A switch 84 is operated by contact roller 85 and lever 86 in a manner to be more fully described hereinafter. In operation, the safety bars 31, 32 and cross arm 38 are retained in a normally horizontal position as shown in Figs. 1 and 2, by means of a spring-loaded detent 87 mounted in boss 88 on bracket 36 and cooperating with a notch or groove 89 in arm 33. In the event of an emergency, the operator of the mill has only to move one of the safety bars 31 or 32 a distance of approximately 2" in order to raise trigger lever 71 by means of arm 38 and cables 78, 79. This action instantly disengages sear 69 from trigger 70, thus permitting plunger 43 to be ejected with great force and extremely high acceleration through end plate 42. Lever 55 pivots on pins 58 and 59 to compress fluid in cylinder 53 and apply the brake, thus stopping the rolls within a fraction of a second. At the same time, axial movement of plunger 43 operates switch 84 to deenergize the main motor circuit (not shown) thereby stopping the motor.

When it is desired to reset the brake loading device, it is only necessary to raise the lever 51 until the trigger 70 re-engages sear 69 on sear lever 63.

Referring now to Fig. 7, the relative efficiency and extremely desirable results achieved with my brake system can be best illustrated by comparing the time and braking torque with the formerly used falling weight device. The curves in Fig. 7 have been calculated and plotted from test data obtained on a 22" x 22" x 60" rubber mill. Curve A is characteristic of such a falling weight device and shows that the brake loading time is not less than .8 second. Likewise, maximum braking torque will not be achieved until nearly one second after the safety bar has been actuated. The braking torque for curve A reaches a maximum of about 2500 K. Curve B is illustrative of the braking system of my invention. It will be noted that maximum torque of about 1200 K. is applied to the brake in less than .03 second from the time that the safety bars are actuated. The terrific stresses produced on the mill and its associated structure are greatly reduced because the maximum torque is less than half that of curve A. The most striking difference however, resides in the fact that with my improved device the rolls may be completely stopped in less than half a second, which in the test mill is equivalent to ¾" of roll travel, so that it is the combination of the peculiar characteristic of my improved braking and brake loading device which has enabled consistent stopping of the mill rolls in 40% of the previous best results and with only 40% of the maximum torque.

It will be understood that the above data refer to a 22" x 22" x 60" mill. Naturally, the requirements of larger or smaller mills to achieve comparable results will dictate certain modifications in the brake loading device, all of which are within the scope of the present invention.

I have therefore provided a braking system which enables a mill having high inertia to be stopped in a comparatively short time. High stresses in the mill are avoided and the device is positive as well as foolproof. Although the total amount of work done in stopping the mill rolls does not vary, with other factors being equal, the characteristics of the loading curve obtained with my device are such that braking torque is applied nearly instantaneously and maintained at a sufficiently high but constant level to bring the mill to a complete stop within less than half a second. My brake system permits utilization of a standard internal expanding hydraulic brake unit in a mill, thus enhancing the desirable characteristics of the installation and it will be appreciated that the device is relatively simple and inexpensive to manufacture.

Having thus described my invention, I claim:

1. A quick-acting brake loading unit comprising a hollow casing, a pair of end plates for said casing, a plunger axially journaled in said end plates, a piston mounted on said plunger inside said casing, a plurality of aligning rods mounted in one of said end plates and extending axially through said piston, a plurality of helical compression springs surrounding said aligning rods and adapted to be compressed between the piston and one of the end plates, a sear lever pivotally mounted on the opposite end plate, a pivotal connection between the sear lever and one end of the plunger, a spring-loaded trigger for said sear lever, a limit stop for said trigger, an actuating lever pivoted to the case and to the plunger, and a hydraulic master cylinder mounted on the case and operatively associated with the actuating lever.

2. A quick-acting brake loading unit comprising a hollow casing, a pair of end plates for said casing, a plunger axially journaled in said end plates, a piston mounted on said plunger inside said casing, a plurality of aligning rods mounted in one of said end plates and extending axially through said piston, a plurality of helical compression springs surrounding said aligning rods and adapted to be compressed between the piston and one of the end plates, a sear lever pivotally mounted on the opposite end plate, a pivotal connection between the sear lever and one end of the plunger, a spring-loaded trigger for said sear lever, a limit stop for said trigger, an actuating lever pivoted to the case and to the plunger, a hydraulic master cylinder mounted on the case and operatively associated with the actuating lever, and means for moving the plunger in the case to compress the springs and reset the trigger.

KENNETH B. CONNER.

REFERENCES CITED

The following references are of record in the file of this patent:

UNITED STATES PATENTS

| Number | Name | Date |
| --- | --- | --- |
| 994,860 | Meloon | June 13, 1911 |
| 1,208,863 | Waldon | Dec. 19, 1916 |
| 1,490,788 | Thropp | Apr. 15, 1924 |
| 2,189,192 | Brock et al. | Feb. 6, 1940 |
| 2,393,312 | Davenport | Jan. 22, 1946 |